United States Patent
Zhang et al.

(10) Patent No.: US 10,248,836 B2
(45) Date of Patent: *Apr. 2, 2019

(54) FINGERPRINT UNLOCKING METHOD AND TERMINAL

(71) Applicant: GUANGDONG OPPO MOBILE TELECOMMUNICATIONS CORP., LTD., Dongguan (CN)

(72) Inventors: Haiping Zhang, Dongguan (CN); Yibao Zhou, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 70 days.

This patent is subject to a terminal disclaimer.

(21) Appl. No.: 15/593,083

(22) Filed: May 11, 2017

(65) Prior Publication Data

US 2017/0344796 A1 Nov. 30, 2017

(30) Foreign Application Priority Data

May 27, 2016 (CN) .......................... 2016 1 0369424

(51) Int. Cl.
G06K 9/00 (2006.01)
G06F 21/32 (2013.01)
G06K 9/46 (2006.01)
G06K 9/03 (2006.01)

(52) U.S. Cl.
CPC ......... *G06K 9/00087* (2013.01); *G06F 21/32* (2013.01); *G06K 9/00026* (2013.01); *G06K 9/00067* (2013.01); *G06K 9/036* (2013.01); *G06K 9/46* (2013.01); *G06K 2009/4666* (2013.01)

(58) Field of Classification Search
CPC ............. G06K 9/0026; G06K 9/00087; G06K 9/00067; G06K 9/036; G06K 9/46; G06K 2009/4666; G06F 21/32
USPC ................................................. 382/124, 125
See application file for complete search history.

(56) References Cited

U.S. PATENT DOCUMENTS

| | | | |
|---|---|---|---|
| 2002/0146156 | A1 | 10/2002 | Morimura et al. |
| 2010/0046810 | A1 | 2/2010 | Yamada |
| 2016/0026840 | A1 | 1/2016 | Li et al. |

FOREIGN PATENT DOCUMENTS

| | | |
|---|---|---|
| CN | 103065134 A | 4/2013 |
| CN | 104464008 A | 3/2015 |
| CN | 105138959 A | 12/2015 |
| CN | 105335731 A | 2/2016 |

(Continued)

OTHER PUBLICATIONS

European Search Report in connection with corresponding EP Application No. 17169799, dated Oct. 9, 2017, 9 pages.

*Primary Examiner* — Daniel G Mariam
(74) *Attorney, Agent, or Firm* — Young Basile Hanlon & MacFarlane, P.C.

(57) ABSTRACT

A fingerprint unlocking method may include receiving a first fingerprint image. The number of target feature points of the first fingerprint image is determined. A target adjustment parameter corresponding to the number of target feature points is acquired according to a preset mapping relation between the number of feature points and adjustment parameters. A second fingerprint image is received according to the target adjustment parameter. A terminal is unlocked when the second fingerprint image matches with a preset fingerprint template. A terminal is also provided.

20 Claims, 7 Drawing Sheets

(56) References Cited

FOREIGN PATENT DOCUMENTS

| CN | 105589643 A | 5/2016 |
|----|-------------|--------|
| EP | 1215620 A2 | 6/2002 |
| EP | 2157531 A2 | 2/2010 |
| WO | 2016015034 A1 | 1/2016 | ns
FINGERPRINT UNLOCKING METHOD AND TERMINAL

CROSS REFERENCE TO RELATED APPLICATIONS

This application claims priority to Chinese Patent Application No. 201610369424.4, filed on May 27, 2016, the content of which is hereby incorporated by reference in its entirety.

TECHNICAL FIELD

The present disclosure relates to the field of electronic devices, and particularly to a fingerprint unlocking method and a terminal.

BACKGROUND

With the rapid development of information technology, terminals (such as cellular phones and tablet computers) are more and more widely used. A fingerprint identification technology serving as a standard configuration technology of the terminal can be widely applied to unlock the terminal, wakeup the terminal, mobile payment, and so on. Whilst the fingerprint identification technology is popular, unlocking time of the terminal is an issue that is directly concerned by terminal manufacturers in order to achieve quick unlocking.

In practical application, users may often find that when a finger is over-dry or over-wet, it is necessary to press a fingerprint identification sensor for many times to make it possible for successful unlocking. Thus, the efficiency of fingerprint unlocking is reduced.

BRIEF DESCRIPTION OF THE DRAWINGS

In order to illustrate the technical solutions in the embodiments of the present disclosure more clearly, a brief description of the accompanying drawings used herein is given below. Obviously, the drawings listed below are some examples of the present disclosure, and persons skilled in the art shall be noted that other drawings can also be obtained on the basis of these drawings without creative efforts.

DETAILED DESCRIPTION OF ILLUSTRATED EMBODIMENTS

The technical solutions in the embodiments of the present disclosure will be described below clearly and completely in conjunction with the accompanying drawings in the embodiments of the present disclosure. Obviously, the described embodiments are some embodiments of the present disclosure, not all of the embodiments. On the basis of the embodiments of the present disclosure, all other embodiments obtained by persons skilled in the art without creative efforts shall fall within the protection scope of the present disclosure.

Terms 'first', 'second', 'third', 'fourth' and the like in the specification and claims of the present disclosure and the drawings are used for distinguishing different objects rather than describing a specific order. In addition, terms 'including' and 'having' and any inflexions thereof are intended to cover a non-exclusive inclusions relationship. For example, processes, methods, systems, products or devices containing a series of operations or units are not limitative to listed processes or units, other processes or units which are not listed are In at least one alternative embodiment included, or other processes or units inherent to these processes, methods, products or devices are further In at least one alternative embodiment included instead.

'Embodiments' involved herein mean that it may be contained in at least one embodiment of the present disclosure in conjunction with specific features, structures or characteristics described by the embodiments. The phrase appearing at each position in the specification may not refer to the same embodiment or may not be an independent or alternative embodiment mutually exclusive from other embodiments. Persons skilled in the art explicitly and implicitly understand that the embodiments described herein may be combined with other embodiments.

Figure 10:
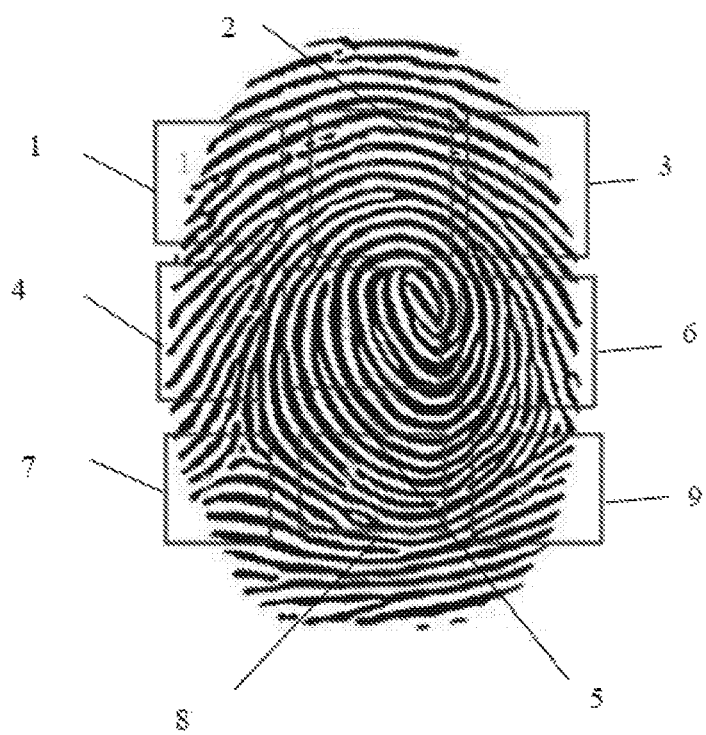
FIG. 10 is a schematic diagram illustrating an example of a fingerprint template.

In the present disclosure, the term "fingerprint template" means that, when a fingerprint function of a terminal such as a mobile phone is enabled for the first time, the user may be asked to undergo a fingerprint registration process. During the fingerprint registration, the user puts his or her finger on a fingerprint sensor for fingerprint image reception, and the fingerprint image received will be stored as a fingerprint template, usually, one finger corresponds to one fingerprint template. Generally, the fingerprint sensor may receive 10-20 times for each finger in order to receive the whole fingerprint face and generate a comprehensive fingerprint template. Characteristic information can be obtained from the fingerprint image received, and for example, the fingerprint template can be saved in the form of image. FIG. 10 illustrates an exemplary fingerprint template, and the numbers marked in the fingerprint of FIG. 10 refers to feature points.

In the following, when we refer to "receive" or "receiving" fingerprint image or fingerprint data, it means that a terminal or a fingerprint recognition sensor of the terminal or other related components of the terminal can acquire, collect, obtain or in other manners to get the fingerprint image or fingerprint data. The present disclosure is not limited thereto.

A terminal illustrated in the embodiments of the present disclosure may include a smart phone (e.g., Android phone, iOS phone, Windows Phone, etc.), a tablet computer, a palmtop computer, a laptop computer, a mobile internet device (MID) or a wearable device. The foregoing terminal is only exemplary rather than exhaustive. The present disclosure is not limited to the foregoing terminal.

In an implementation, adjustment parameters of a fingerprint identification chip in a fingerprint identification sensor mainly include an analog-to-digital converter (ADC) offset and an ADC gain. The ADC offset is configured to indicate an offset of an ADC. For example, a fingerprint collection chip can collect 56*172 pixel points, each pixel point corresponds to a pixel value in an image collection process of the fingerprint collection chip, thus 10752 pixel values can be obtained. After the pixel values are normalized (namely, the pixel values fall within a range from 0 to 1), normally, most of the pixel values fall within a range from 0.4 to 0.8. Since the pixel value of each pixel point is different, a pixel point distribution diagram may be formed. The ADC offset may have several grades, when the ADC offset is higher, an overall pixel value corresponding to the pixel point distribution diagram is larger, and a fingerprint image will appear blacker. The ADC gain is configured to indicate a gain of the ADC. When the gain is larger, the distribution diagram will be more dispersed. When the gain is smaller, the distribution diagram will be more centralized. When the distribution diagram is more dispersed, the image contrast will be higher, black pixel points in the fingerprint image are blacker, and white pixel points in the fingerprint image are whiter. The adjustment parameters of the fingerprint identification chip in the fingerprint identification sensor may further include a pixel gain, and the pixel gain is configured to indicate a gain of a pixel point. The pixel gain is determined by capacitors coupled to an amplifier in parallel. A number of capacitors are coupled to the amplifier in parallel, and each capacitor may be controlled by a switch. When switches are turned on frequently, the gain is larger, the pixel value is larger, and the signal strength is higher. In practical application, in an ADC control process, the pixel gain is generally fixed, and the ADC offset and ADC gain are mainly adjusted. The ADC offset is configured to adjust the position of the whole distribution diagram, and the ADC gain is configured to adjust the centralized and dispersed situations of the distribution diagram. For example, when a user presses the fingerprint identification sensor, image collection may be debugged by means of different adjustment parameters. For example, if the ADC offset has five grades, and the ADC gain has five grades, twenty-five combinations can be obtained, and at most twenty-five fingerprint images can be collected each time.

Furthermore, In at least one alternative embodiment, the adjustment parameters at least include the ADC offset and the ADC gain. The ADC offset has M first adjustment grades, and the ADC gain has N second adjustment grades, and M and N are integers greater than 1. Thus, when the terminal detects that the fingerprint identification sensor is pressed, fingerprints are collected by means of any first adjustment grade selected from the M first adjustment grade and any second adjustment grade selected from the N second adjustment grade to obtain a number of fingerprint images. In at least one embodiment, three fingerprint images may be obtained. For example, three fingerprint images, namely a first fingerprint image, a second fingerprint image, and a third fingerprint image, are obtained by adjusting the ADC offset and the ADC gain. For example, the ADC offset is adjusted to be the maximum grade and the ADC gain is adjusted to be the maximum grade to obtain the first fingerprint image, the ADC offset is adjusted to be the minimum grade and the ADC gain is adjusted to be the minimum grade to obtain the second fingerprint image, and the ADC offset is adjusted to the intermediate grade and the ADC gain is adjusted to the intermediate grade to obtain the third fingerprint image.

The present disclosure relates to a fingerprint unlocking method. The method includes the follows. A first fingerprint image is received. The number of target feature points of the first fingerprint image is determined. A target adjustment parameter corresponding to the number of target feature points is acquired according to a preset mapping relation between the number of feature points and adjustment parameters. A second fingerprint image is received according to the target adjustment parameter. A terminal is unlocked when the second fingerprint image matches with a preset fingerprint template. By means of the fingerprint unlocking method, the efficiency of fingerprint unlocking can be improved.

The present disclosure further relates to a terminal to execute the fingerprint unlocking method.

Figure 1:
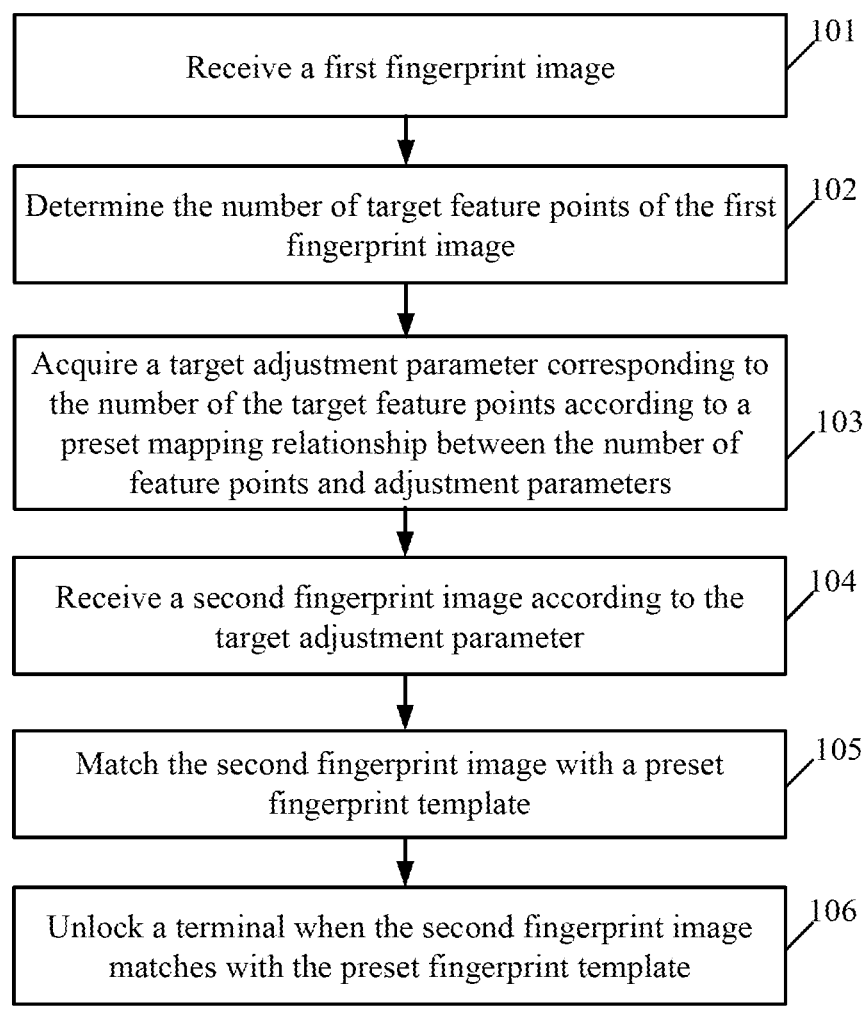
FIG. 1 is a flow chart of a fingerprint unlocking method in accordance with a first embodiment of the present disclosure.

FIG. 1 illustrates a flow chart of a fingerprint unlocking method in accordance with a first embodiment of the present disclosure. The fingerprint unlocking method described in the present embodiment can begin at block 101.

At block 101, a first fingerprint image is received.

In an implementation, during a process that a user presses a fingerprint identification sensor, some or all fingerprints of the user may be collected, and the first fingerprint image can be accordingly received.

In at least one alternative embodiment, the first fingerprint image may be a fingerprint image received during the process that the user presses the fingerprint identification sensor, or may be a fingerprint image saved locally.

Furthermore, in at least one alternative embodiment, the first fingerprint image may be a fingerprint image of a finger of the user or fingerprint images of several fingers of the user.

In at least one alternative embodiment, during the process that the user presses the fingerprint identification sensor, an effective range where the user presses the fingerprint identification sensor can be determined. The fingerprint identification sensor collects pixel points within the effective range, and the first fingerprint image can be accordingly received. Furthermore, a pressing strength of the user touching each collection point in the fingerprint identification sensor can be detected, and collection points each having the pressing strength greater than a certain threshold are configured to determine the effective range. That is, the fingerprint identification sensor can be combined with a pressure sensor, thus when the fingerprint identification sensor is pressed, the pressing strength of pressing each collection point in the fingerprint identification sensor can be detected by means of the pressure sensor, and an image formed by the collection points each having the pressing strength greater than the certain threshold is determined as the first fingerprint image.

In at least one alternative embodiment, a manner in which the first fingerprint image is determined may further include the following. When the user presses the fingerprint identification sensor, a collection region of the fingerprint identification sensor is determined. $n2$ normal underlying data values are determined by means of $n2$ normal sensing electrodes in the collection region, and $n1$ abnormal underlying data values are determined by means of $n1$ abnormal sensing electrodes in the collection region. A sensing electrode array of the fingerprint identification sensor at least includes the $n1$ abnormal sensing electrodes and the $n2$ normal sensing electrodes, and $n1$ and $n2$ are positive integers. $n1$ underlying repairable data values corresponding to the n1 abnormal sensing electrodes are determined according to the n2 normal underlying data values determined by means of the n2 normal sensing electrodes in the fingerprint identification sensor. The first fingerprint image is generated according to the n2 normal underlying data values and the n1 underlying repairable data values.

In at least one alternative embodiment, the process that the n1 underlying repairable data values corresponding to the n1 abnormal sensing electrodes are determined according to the n2 normal underlying data values determined by means of the n2 normal sensing electrodes of the fingerprint identification sensor may include the following. The collection region is divided into a number of independent regions, and each of the independent regions contains a number of the normal underlying data values determined by means of the normal sensing electrodes and at least one of the abnormal underlying data values determined by means of the abnormal sensing electrodes. An average value of all the normal underlying data values in the independent region i is determined, the average value is determined to be the underlying repairable data value corresponding to the abnormal sensing electrodes in the independent region i, and the independent region i is any one of the independent regions. That is, in the independent region i, the underlying repairable data value is used as the underlying data value of each abnormal sensing electrode. In this way, the normal underlying data values of the normal sensing electrodes in any independent region can be used to repair the abnormal underlying data values in the independent region. Thus, the quality of the first fingerprint image is better, and accordingly, more feature points can be extracted from the first fingerprint image.

At block 102, the number of target feature points of the first fingerprint image is determined.

In an implementation, the first fingerprint image may be subjected to feature extraction. Feature points of the first fingerprint image are extracted, and the number of the feature points extracted can be determined as the number of the target feature points.

In at least one alternative embodiment, the first fingerprint image can be divided into N independent regions, and N is an integer larger than 1. The number of feature points within a unit area is determined according to some of the N independent regions, and the number of the feature points within the unit area is determined as the number of the target feature points. The first fingerprint image can be divided into N independent regions, some of the N independent regions are randomly selected, and the independent regions selected may be one or more of the N independent regions. Feature points of each of the some independent regions are extracted, the number of feature points within a unit area is calculated according to the area of the independent regions and the number of the total feature points, and the number of the feature points within the unit area is determined as the number of the target feature points.

In at least one alternative embodiment, feature points of the first fingerprint image can be extracted, and the number of the feature points is counted and determined as the number of the target feature points. That is, all feature points of the first fingerprint image are extracted, and the number of the feature points is counted and determined as the number of the target feature points. An algorithm for extracting the feature points of the first fingerprint image may be consistent with an algorithm for extracting feature points of a preset fingerprint template.

At block 103, a target adjustment parameter corresponding to the number of target feature points is acquired according to a preset mapping relation between the number of feature points and adjustment parameters.

In an implementation, the mapping relationship between the number of feature points and adjustment parameters is established before implementing the process at block 101. Specifically, fingerprint images are received for N times, and the number of feature points of each fingerprint image is recorded. By taking a fingerprint image received at a certain time as an example, the number of feature points of the fingerprint image received at this time can be recorded, and the fingerprint image is adjusted to obtain an optimal fingerprint image, and the adjustment parameter used at this time is determined as the adjustment parameter for adjusting the fingerprint image received at this time. During a process of receiving fingerprint images for N times, the number of feature points of a certain fingerprint image may correspond to multiple sets of adjustment parameters, and the multiple sets of adjustment parameters may be fitted or optimized to obtain a set of adjustment parameters.

At block 104, a second fingerprint image is received according to the target adjustment parameter.

In an implementation, the second fingerprint image can be received by a collection on the basis of the target adjustment parameter.

In at least one alternative embodiment, a preset number of pixel points are collected according to the target adjustment parameter, and the second fingerprint image is accordingly received, and the preset number may be specified by a user or defaulted by a system.

At block 105, the second fingerprint image is matched with a preset fingerprint template.

In specific implementation, first fingerprint prints of the second fingerprint image are extracted, and when the first fingerprint prints are matched with second fingerprint prints of the preset fingerprint template and a matching value reaches a certain threshold, it can be determined that the first fingerprint prints are successfully matched with the second fingerprint prints of the preset fingerprint template. When the matching value does not reach the certain threshold, it can be determined that the first fingerprint prints are unsuccessfully matched with the second fingerprint prints of the preset fingerprint template. Feature points such as Harris corners and scale-invariant feature transform (SIFT) corners of the second fingerprint image may be extracted. First feature points of the collected second fingerprint image may be matched with second feature points of the preset fingerprint template. When a matching value reaches a certain threshold, it is determined that the first feature points of the second fingerprint image are successfully matched with the second feature points of the preset fingerprint template, and when the matching value does not reach the certain threshold, it is determined that the first feature points of the second fingerprint image are unsuccessfully matched with the second feature points of the preset fingerprint template.

At block 106, when the second fingerprint image is successfully matched with the preset fingerprint template, a terminal is unlocked.

In an implementation, when the second fingerprint image is successfully matched with the preset fingerprint template, the terminal may be unlocked or a certain application in the terminal may be unlocked. For example, when the terminal is in a screen-off state, the terminal is unlocked, a display screen of the terminal is turned on, and a desktop is displayed. Or, when the terminal is in a screen-on state, the terminal is unlocked, and a desktop is displayed. Or, when the terminal is in an unlocked state, at least one application in the terminal is unlocked, that is, the at least one application is initiated or a preset page of a certain application in the at least one application is displayed. Or, when the terminal is in a screen-off state, at least one application in the terminal may be unlocked, that is, the at least one application is initiated or a preset page of a certain application of the at least one application is displayed. The preset page of the certain application may be a certain defaulted page, or, a page displayed when the user closed the application last time, or a page having the highest opening frequency or longest display time.

In the embodiment, the number of the target feature points is determined by means of the first fingerprint image, the target adjustment parameter corresponding to the number of the target feature points is obtained according to the preset mapping relationship between the number of feature points and adjustment parameters, the second fingerprint image is received according to the target adjustment parameter, and after the second fingerprint image is successfully matched with the preset fingerprint template, the terminal is unlocked, thus the efficiency of fingerprint unlocking can be improved.

Figure 2:
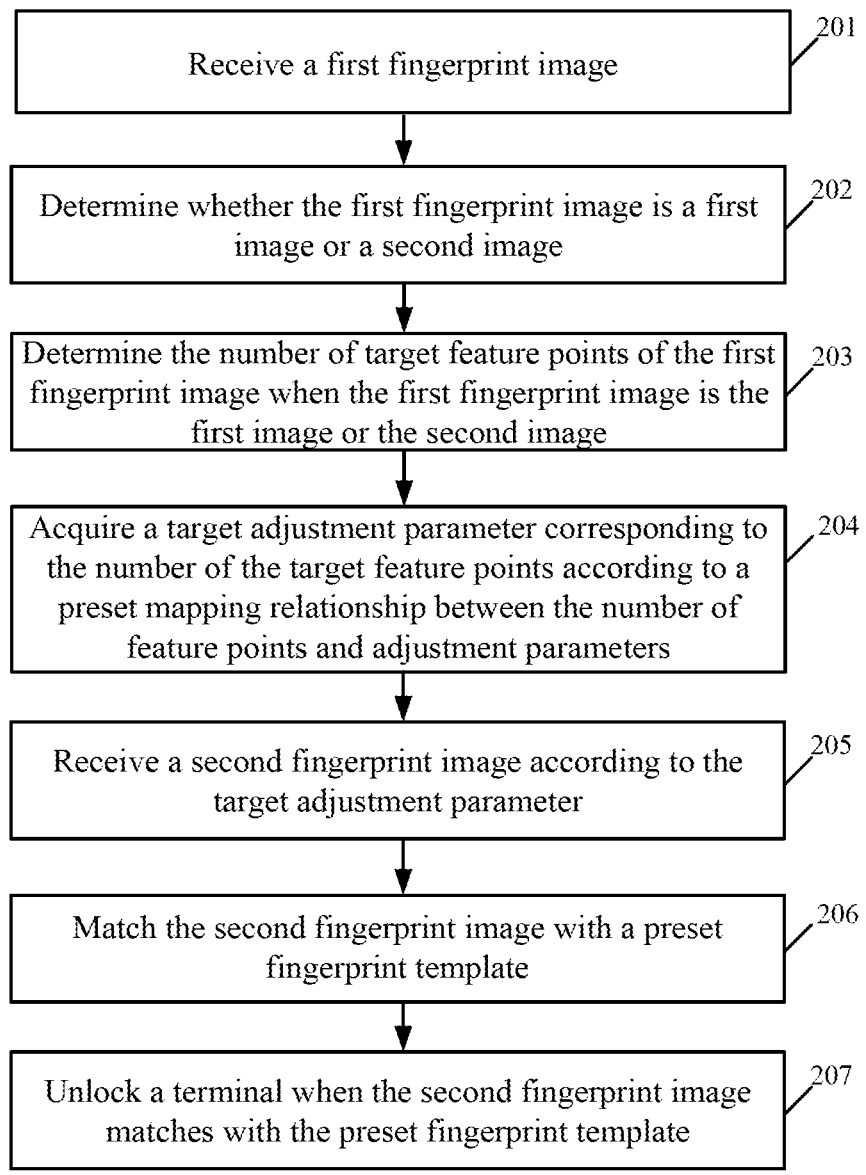
FIG. 2 is a flow chart of a fingerprint unlocking method in accordance with a second embodiment of the present disclosure.

FIG. 2 is a flow chart of a fingerprint unlocking method in accordance with an embodiment of the present disclosure. The fingerprint unlocking method illustrated in the present embodiment can begin at block 201.

At block 201, a first fingerprint image is received.

At block 202, whether the first fingerprint image is a first image or a second image is judged.

In an implementation, the first image may be a fingerprint image of a dry finger, and in the first image, fingerprint prints may be intermittent. The second image may be a fingerprint image of a wet finger, and in the second image, large-scale fingerprint prints may be fuzzy and hardly seen. Therefore, the fingerprint image may be analyzed to judge whether the fingerprint image is the first image or the second image, that is, whether the fingerprint image is the fingerprint image of the dry finger or the fingerprint image of the wet finger.

In at least one alternative embodiment, print features of the first fingerprint image may be extracted to judge whether the first fingerprint image is the first image or the second image. When the prints of the first fingerprint image are intermittent, the first fingerprint image is the first image, and when large-scale fingerprint prints in the fingerprint image are fuzzy, the first fingerprint image is the second image.

In another specific implementation, the fingerprint image containing less feature points can be referred to be the fingerprint image of the dry finger or the fingerprint image of the wet finger. Thus, when the number of the feature points of the first fingerprint image is smaller (for example, smaller than a threshold), it can be determined that the first fingerprint image is the fingerprint image of the dry finger or the wet finger.

In at least one alternative embodiment, feature points of the first fingerprint image may be extracted. Whether the number of the feature points of the first fingerprint image is smaller than a first preset threshold is judged. When the number of the feature points of the first fingerprint image is smaller than the first preset threshold, it is determined that the first fingerprint image is the first image or the second image.

In at least one alternative embodiment, feature points within a partial region of the first fingerprint image may be extracted. Whether the number of the feature points of the first fingerprint image is smaller than a second preset threshold is determined. When the number of the feature points of the first fingerprint image is smaller than the second preset threshold, it is determined that the first fingerprint image is the first image or the second image. The partial region may be a specified region in the first fingerprint image such as a region having a preset size and taking the center of the first fingerprint image as a circle point. The partial region may be a random region in the first fingerprint image. The second preset threshold may be a fixed threshold, or the second preset threshold may be associated with the area of the first fingerprint image.

In at least one alternative embodiment, whether the number of the feature points extracted from the first fingerprint image falls within a preset range is determined. The maximum value of the preset range may be smaller than a first threshold. For example, the first threshold may be a preset percentage (for example, 50%) of the number of the feature points of the first fingerprint image, or the first threshold is a certain system default value. Furthermore, values of the preset range may fall between a second threshold and a third threshold, and the second threshold is smaller than the third threshold. The third threshold may be a preset percentage (for example, 50%) of the number of the feature points of the first fingerprint image, or the third threshold is a certain system default value. The second threshold may be a preset percentage (for example, 30%) of the number of the feature points of the first fingerprint image, or the second threshold is a certain system default value.

At block 203, when the first fingerprint image is the first image or the second image, the number of target feature points of the first fingerprint image is determined.

When the first fingerprint image is not the first image and not the second image, a fingerprint image may be directly received according to a default adjustment parameter, or, the first fingerprint image is directly matched with the preset fingerprint template, and when matching succeeds, the terminal is unlocked.

At block 204, a target adjustment parameter corresponding to the number of the target feature points is acquired according to a preset mapping relationship between the number of feature points and adjustment parameters.

At block 205, a second fingerprint image is received according to the target adjustment parameter.

At block 206, the second fingerprint image is matched with the preset fingerprint template.

At block 207, when the second fingerprint image is successfully matched with the preset fingerprint template, the terminal is unlocked.

The processes at block 201 and block 203 to block 207 can correspond to the processes at block 101 to block 106 of the fingerprint unlocking method illustrated by FIG. 1.

It the present disclosure, when the first fingerprint image is the image of the dry finger or the image of the wet finger, the number of the target feature points of the first fingerprint image can be determined, and the target adjustment parameter corresponding to the number of the target feature points is obtained according to the preset mapping relationship between the number of feature points and adjustment parameters. The second fingerprint image is received according to the target adjustment parameter, and after the second fingerprint image is successfully matched with the preset fingerprint template, the terminal is unlocked, thus the efficiency of fingerprint unlocking can be improved. Furthermore, when the first fingerprint image is the image of the dry finger or the image of the wet finger, the unlocking count may be effectively reduced, and the unlocking efficiency is improved.

Figure 3:
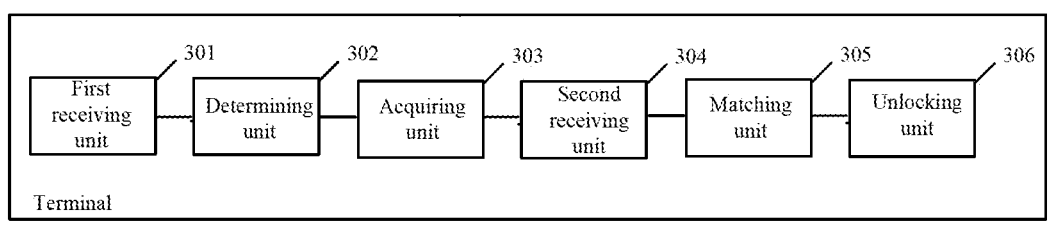
FIG. 3 is a structure diagram of a terminal in accordance with a first embodiment of the present disclosure.

FIG. 3 is a structure diagram of a terminal according to an embodiment of the present disclosure. The terminal described in the present embodiment may include a first receiving unit 301, a determining unit 302, an acquiring unit 303, a second receiving unit 304, a matching unit 305, and an unlocking unit 306. The above units can be realized through one or more processors, for example, the above units can be integrated in one processor, or, can be distributed among different processors.

The first receiving unit 301 is configured to receive a first fingerprint image.

The determining unit 302 is configured to determine the number of target feature points of the first fingerprint image received by the first receiving unit 301;

The acquiring unit 303 is configured to acquire a target adjustment parameter corresponding to the number of the target feature points determined by the determining unit 302 according to a preset mapping relationship between the number of feature points and adjustment parameters.

The second receiving unit 304 is configured to receive a second fingerprint image according to the target adjustment parameter acquired by the acquiring unit 303.

The matching unit 305 is configured to match the second fingerprint image received by the second receiving unit 304 with a preset fingerprint template.

The unlocking unit 306 is configured to unlock the terminal when a matching result of the matching unit 305 is that the second fingerprint image is successfully matched with the preset fingerprint template.

Figure 4:
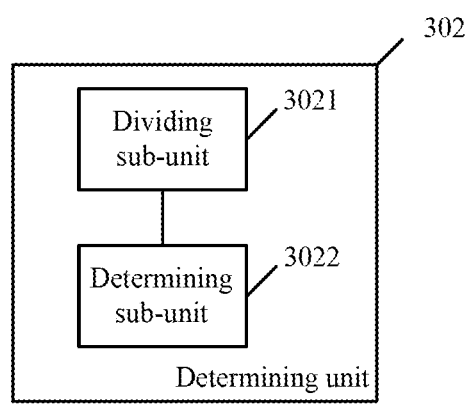
FIG. 4 is a structure diagram of a determining of the terminal illustrated in FIG. 3 in accordance with an embodiment of the present disclosure.

In at least one alternative embodiment, as illustrated in FIG. 4, the determining unit 302 of the terminal illustrated in FIG. 3 includes a dividing sub-unit 3021 and a determining sub-unit 3022.

The dividing sub-unit 3021 is configured to divide the first fingerprint image into N independent regions, and N is an integer greater than 1.

The determining sub-unit 3022 is configured to determine the number of feature points within a unit area according to some of the N independent regions, and determine the number of the feature points within the unit area to be the number of the target feature points.

Figure 5:
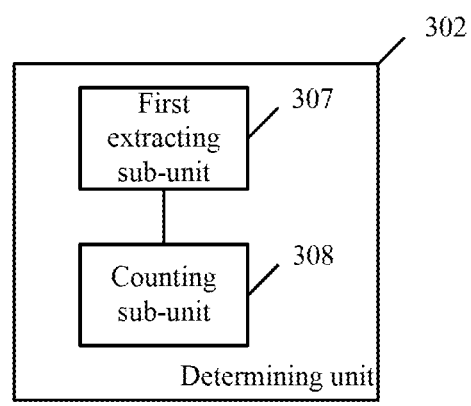
FIG. 5 is a structure diagram of a determining of the terminal illustrated in FIG. 3 in accordance with an embodiment of the present disclosure.

In at least one alternative embodiment, as illustrated in FIG. 5, the determining unit 302 of the terminal illustrated in FIG. 3 includes a first extracting sub-unit 307 and a counting sub-unit 308.

The first extracting sub-unit 307 is configured to extract feature points of the first fingerprint image.

The counting sub-unit 308 is configured to count the number of the feature points extracted by the first extracting sub-unit 307, and determine the number of the feature points to be the number of the target feature points.

Figure 6:
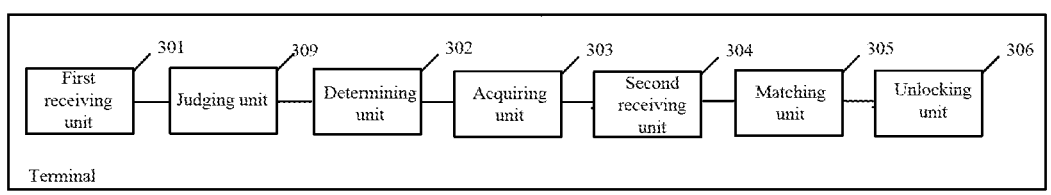
FIG. 6 is another structure diagram of a terminal in accordance with the first embodiment of the present disclosure.

In at least one embodiment, as illustrated in FIG. 6, the terminal illustrated in FIG. 3 may further include a judging unit 309 configured to judge whether the first fingerprint image is a first image or a second image after the first receiving unit 301 receives the first fingerprint image. When the judging unit 309 judges that the first fingerprint image is the first image or the second image, the determining unit 302 determines the number of the target feature point of the first fingerprint image.

Figure 7:
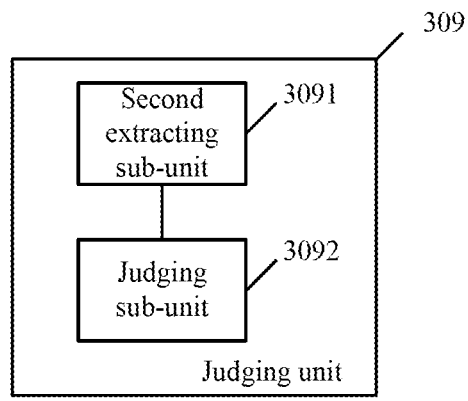
FIG. 7 is a structure diagram of a judging unit of the terminal illustrated in FIG. 6 in accordance with an embodiment of the present disclosure.

Furthermore, in at least one alternative embodiment, as illustrated in FIG. 7, the judging unit 309 of the terminal illustrated in FIG. 6 may further include a second extracting sub-unit 3091 and a judging sub-unit 3092.

The second extracting sub-unit 3091 is configured to extract feature points of a partial region of the first fingerprint image.

The judging sub-unit 3092 is configured to judge whether the number of the feature points of the partial region extracted by the second extracting sub-unit 3091 is smaller than a preset threshold, and when the number of the feature points of the partial region extracted by the second extracting sub-unit 3091 is smaller than the preset threshold, the judging sub-unit 3092 determines that the first fingerprint image is the first image or the second image.

In at least one alternative embodiment, the second receiving unit 304 is configured to collect a preset number of pixel points according to the target adjustment parameter, and receive the second fingerprint image according to the preset number of pixel points.

In the embodiment, the number of the target feature points is determined by means of the first fingerprint image, the target adjustment parameter corresponding to the number of the target feature points is obtained according to the preset mapping relationship between the number of feature points and adjustment parameters, the second fingerprint image is received according to the target adjustment parameter, and after the second fingerprint image is successfully matched with the preset fingerprint template, the terminal is unlocked, thus the efficiency of fingerprint unlocking can be improved.

Figure 8:
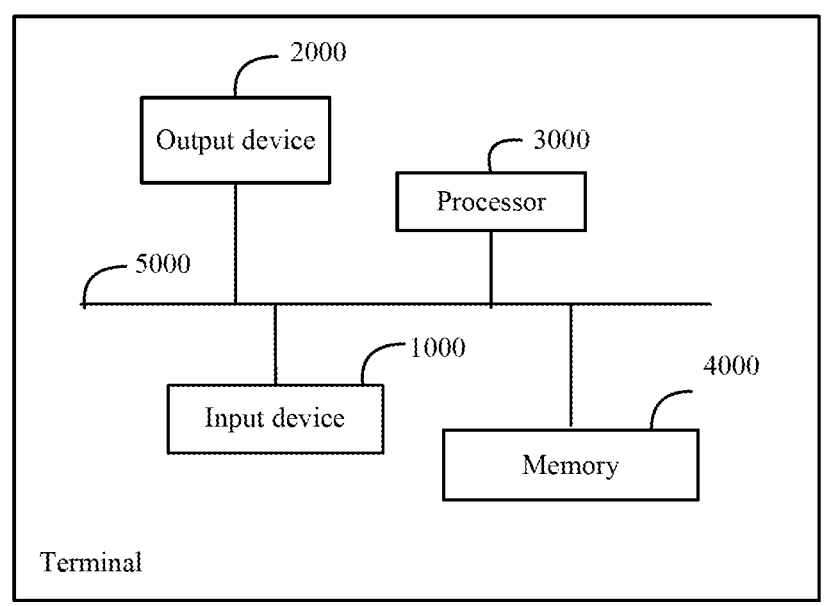
FIG. 8 is a structure diagram of a terminal in accordance with a second embodiment of the present disclosure.

FIG. 8 is a structure diagram of a terminal in accordance with a second embodiment of the present disclosure. The terminal illustrated in the present embodiment may include at least one input device 1000, at least one output device 2000, at least one processor 3000 (such as a central processing unit (CPU)), and a memory 4000. The input device 1000, the output device 2000, the processor 3000, the memory 4000, and a communication interface (not indicated) are coupled together via a bus 5000.

The input device 1000 may be a touch panel, a physical key, a mouse, a fingerprint identification sensor, etc.

The output device 2000 may be a display screen.

The memory 4000 may be a high-speed random access memory (RAM), or may be a non-volatile memory such as a disk memory. The memory 4000 is configured to store a set of program codes. The processor 3000 is configured to invoke the program codes stored in the memory 4000 to execute the following operations: receiving a first fingerprint image; determining the number of target feature points of the first fingerprint image; acquiring a target adjustment parameter corresponding to the number of the target feature points according to a preset mapping relationship between the number of feature points and adjustment parameters; receiving a second fingerprint image according to the target adjustment parameter; and unlocking a terminal when the second fingerprint image matches with a preset fingerprint template.

In at least one alternative embodiment, the processor 3000 is configured to invoke the program codes stored in the memory 4000 to perform the follows to determine the number of the target feature point of the first fingerprint image. The first fingerprint image is divided into N independent regions, and N is an integer greater than 1. The number of feature points within a unit area is determined according to some of the N independent regions, and the number of the feature points within the unit area is determined to be the number of the target feature points.

In at least one alternative embodiment, the processor 3000 is configured to invoke the program codes stored in the memory 4000 to perform the follows to determine the number of the target feature points of the first fingerprint image. Feature points of the first fingerprint image are extracted, and the number of the feature points is determined to be the number of the target feature points.

In at least one alternative embodiment, the processor 3000 is configured to invoke the program codes stored in the memory 4000 to perform the follows after the first fingerprint image is received and before the number of the target feature points of the first fingerprint image is determined. Whether the first fingerprint image is a first image or a second image is determined, and when the first fingerprint image is the first image or the second image, the number of the target features of the first fingerprint image is determined.

In at least one alternative embodiment, the processor 3000 is configured to invoke the program codes stored in the memory 4000 to perform the follows to judge whether the first fingerprint image is the first image or the second image. Feature points of a partial region of the first fingerprint image are extracted, and whether the number of the feature points of the partial region is smaller than a preset threshold is determined. When the number of the feature points of the partial region is smaller than the preset threshold, the first fingerprint image is determined to be the first image or the second image.

In at least one alternative embodiment, the processor 3000 is configured to invoke the program codes stored in the memory 4000 to perform the follows to receive the second fingerprint image according to the target adjustment parameter. A preset number of pixel points is acquired according to the target adjustment parameter, and the second fingerprint image is received according to the preset number of pixel points.

In at least one alternative embodiment, the processor 3000 is configured to invoke the program codes stored in the memory 4000 to perform the follows to receive the first fingerprint image. When a user presses a fingerprint identification sensor, a collection region of the fingerprint identification sensor is determined. n2 normal underlying data values are determined by means of n2 normal sensing electrodes in the collection region, and n1 abnormal underlying data values are determined by means of n1 abnormal sensing electrodes in the collection region. An sensing electrode array of the fingerprint identification sensor at least contains the n1 abnormal sensing electrodes and the n2 normal sensing electrodes, and the n1 and the n2 are positive integers. n1 underlying repairable data values corresponding to the n1 abnormal sensing electrodes are determined according to the n2 normal underlying data values determined by means of the n2 normal sensing electrodes of the fingerprint identification sensor, and the first fingerprint image is generated according to the n2 normal underlying data values and the n1 underlying repairable data values.

In at least one alternative embodiment, the processor 3000 is configured to invoke the program codes stored in the memory 4000 to perform the follows to determine the n1 underlying repairable data values corresponding to the n1 abnormal sensing electrodes according to the n2 normal underlying data values determined by means of the n2 normal sensing electrodes of the fingerprint identification sensor. The collection region is divided into a number of independent regions, and each of the independent regions contains a number of the normal underlying data values determined by means of the normal sensing electrodes and at least one of the abnormal underlying data values determined by means of the abnormal sensing electrodes. An average value of all the normal underlying data values in an independent region i is determined, and the average value is determined to be the underlying repairable data value corresponding to the abnormal sensing electrodes in the independent region i, and the independent region i is any one of the independent regions.

Figure 9:
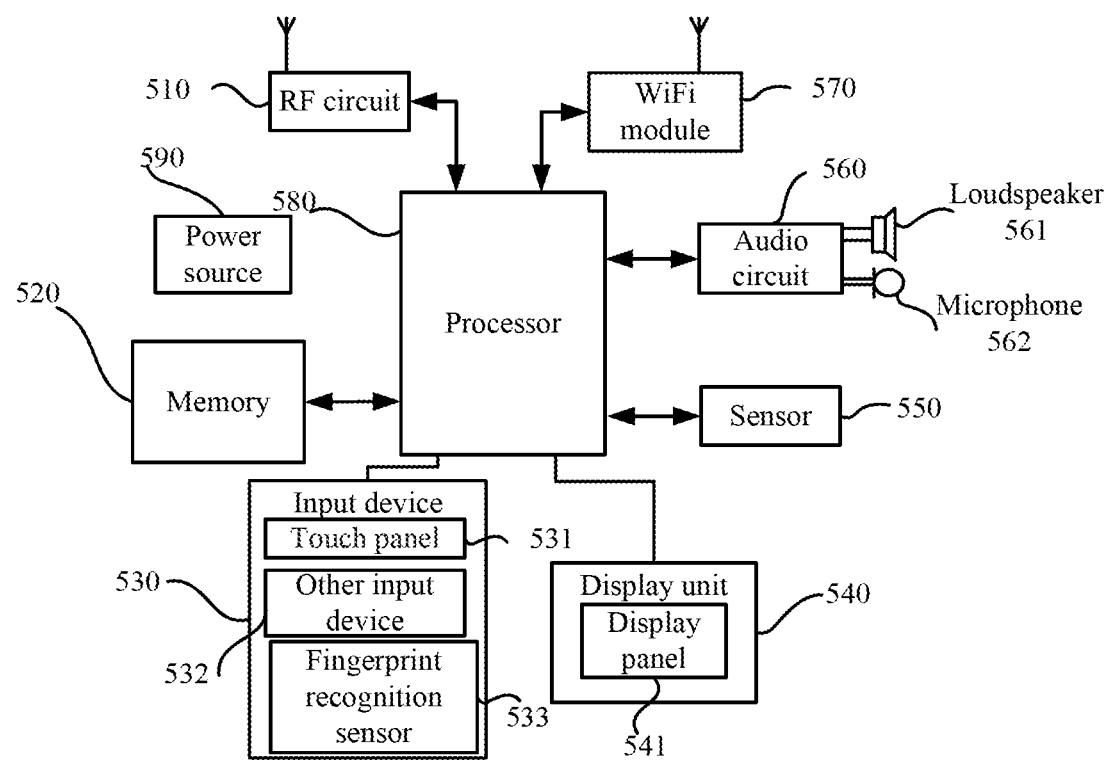
FIG. 9 is a structure diagram of a cellular phone in accordance with an embodiment of the present disclosure.

FIG. 9 is a structure diagram of a cellular phone in accordance with an embodiment of the present disclosure. The cellular phone includes a radio frequency (RF) circuit 510, a memory 520, an input unit 530, a display unit 540, a sensor 550, an audio circuit 560, a wireless fidelity (WiFi) module 570, a processor 580, a power supply 590, and other parts. Persons skilled in the art may understand that the cellular phone structure illustrated in FIG. 5 is not limitative to the cellular phone, and the cellular phone may include parts more or fewer than those illustrated in the figure, or combine some parts, or have different part arrangements.

Each component of the cellular phone will be specifically illustrated below in conjunction with FIG. 9.

The RF circuit 510 may be configured to receive and transmit signals in an information receiving and transmitting or communication process, and transmit received downlink information of a base station to the processor 580 for processing. In addition, uplink data is transmitted to the base station. Generally, the RF circuit 510 includes, but is not limited to, an antenna, at least one amplifier, a transceiver, a coupler, a low noise amplifier (LNA), a duplexer, etc. In addition, the RF circuit 510 may further communicate with other devices via wireless communication and a network. The wireless communication may use any one communication standard or protocol, including, but not limited to, a global system of mobile communication (GSM), general packet radio service (GPRS), code division multiple access (CDMA), wideband code division multiple access (WCDMA), long term evolution (LTE), an E-mail, short messaging service (SMS), etc.

The memory 520 may be configured to store software programs and modules, and the processor 580 executes various function applications and data processing of the cellular phone by running the software programs and the modules stored in the memory 520. The memory 520 may mainly include a storage program region and a storage data region. The storage program region may store an operation system, and an application program needed for at least one function (such as a sound playing function and an image playing function). The storage data region may store data (such as audio data and a phone book) created according to use of the cellular phone. In addition, the memory 520 may include a high-speed RAM, and may further include a non-volatile memory such as a disk storage device, a flash device, or other non-volatile solid storage devices.

The input unit 530 may be configured to receive input digital or character information and generate key signal input associated with user setting and functional control of the cellular phone. Specifically, the input unit 530 may include a touch panel 531, other input devices 532, and a fingerprint recognition sensor 533. The touch panel 531 is also invoked as a touch screen, capable of collecting touch operations of user executed thereon or nearby (for example, operations of a user executed on the touch panel 531 or nearby the touch panel 531 by using fingers or any suitable objects or accessories such as a touch pen), and driving a corresponding connecting apparatus according to a preset program. In at least one alternative embodiment, the touch panel 531 may include two parts, namely a touch detection apparatus and a touch controller. The touch detection apparatus detects the touch direction of the user, detects signals bought by the touch operation and transmits the signals to the touch controller. The touch controller receives touch information from the touch detection apparatus, converts the touch information into contact coordinates, transmits the contact coordinates to the processor 580, and can receive a command sent by the processor 580 to be executed. In addition, the touch panel 531 may be implemented by means of multiple types such as a resistance type, a capacitance type, infrared rays, and surface acoustic waves. The input unit 530 may further include, in addition to the touch panel 531, other input devices 532. Specifically, the other input devices 532 may include, but are not limited to, one or more of a physical keyboard, a functional key (such as a volume control key and a switch key), a track ball, a mouse, and an operating rod. The fingerprint recognition sensor 533 can be set in combination with a dome key of the terminal device, and can also be set in combination with the touch panel 531. For example, the fingerprint recognition sensor 533 is set below the touch panel 531. When a finger of a user presses an application icon, the fingerprint recognition sensor below the touch panel 531 can collect fingerprint data of the finger of the user.

The display unit 540 may be configured to display information input by the user or information provided for the user or various menus of the cellular phone. The display unit 540 may include a display panel 541, and In at least one alternative embodiment, the display panel 541 may be configured in a form of a Liquid Crystal Display (LCD), an Organic Light-Emitting Diode (OLED), etc. Furthermore, the touch panel 531 may cover the display panel 541. When the touch panel 531 detects the touch operation thereon or nearby, the touch operation is transmitted to the processor 580 to determine the type of a touch event, and then the processor 580 provides corresponding visual output on the display panel 541. Although, the touch panel 531 and the display panel 541 implement input of the cellular phone and input functions by serving as two independent parts in FIG. 8, the touch panel 531 and the display panel 541 may be integrated to implement the input of the cellular phone and the input functions in some embodiments.

The cellular phone may further include at least one sensor 550 such as a light sensor, a motion sensor and other sensors. Specifically, the light sensor may include an ambient light sensor and a proximity sensor, the ambient light sensor may adjust the luminance of the display panel 541 according to the brightness of ambient light, and the proximity sensor may close the display panel 541 and/or backlight when the cellular phone reaches nearby the ear. As one of the motion sensors, an accelerometer sensor may detect the magnitude of an accelerated speed in each direction (generally, three-axis), the size and direction of a gravity may be detected while resting, and the accelerometer sensor may be configured to identify an application of a cellular phone gesture (e.g., horizontal and vertical screen switching, relevant games, and magnetometer gesture calibration), and vibration identification relevant functions (e.g., pedometer and knocking), etc. . . . . Other sensors such as a gyroscope sensor, a barometer sensor, a hygrometer sensor, a thermometer sensor and an infrared sensor configurable for the cellular phone will not be elaborated herein.

The audio circuit 560, a loudspeaker 561 and a microphone 562 may provide an audio interface between the user and the cellular phone. The audio circuit 560 may transmit an electric signal converted from the received audio data to the loudspeaker 561, and the loudspeaker 561 converts the electric signal into a sound signal for output. Besides, the microphone 562 converts a collected sound signal into an electric signal, the audio circuit 560 converts the received electric signal into audio data and then outputs the audio data to the processor 580 for processing, the audio data is transmitted to another cellular phone via the RF circuit 510, or the audio data is output to the memory 520 for further processing.

WiFi belongs to a short-range wireless transmission technology, the cellular phone may assist the user in E-mail receiving and sending, webpage browsing, access to streaming media and the like by means of the WiFi module 570, and it provides a wireless wideband internet access for the user. Although FIG. 8 shows the WiFi module 570, it may be understood that the WiFi module 570 does not belong to necessary components of the cellular phone and can totally be omitted without changing the essence of the present disclosure as required.

The processor 580 is a control center of the cellular phone, and is configured to connect all parts of the whole cellular phone by utilizing various interfaces and lines, to run or execute the software program and/or the module stored in the memory 520, and to invoke data stored in the memory 520 to execute various functions and processing data of the cellular phone, so as to wholly monitor the cellular phone. In at least one alternative embodiment, the processor 580 may include one or more processing units. Preferably, the processor 580 may be integrated with an application processor and a modulation-demodulation processor, the application processor mainly processes an operation system, a user interface, an application program and the like, and the modulation-demodulation processor mainly processes wireless communication. It may be understood that the modulation-demodulation processor may not be integrated into the processor 580.

The cellular phone may further include a power supply 590 (such as a battery) for supplying power to each component. Preferably, the power supply may be connected with the processor 580 logically via a power supply management system, so as to implement functions of charging, discharging and power consumption management and the like by means of the power supply management system.

The cellular phone may further include a camera, a Bluetooth module and the like, which are not shown, though, will not be elaborated herein.

In the foregoing embodiments, each step method flow may be implemented on the basis of the structure of the terminal, and the sensor 550 or the touch panel 531 may be used as a fingerprint identification sensor.

The embodiments of the present disclosure also provide a computer storage medium. The computer storage medium may store a program, and the program executes some or all of the steps of any one fingerprint unlocking method in the method embodiment.

Although the present disclosure is described herein in conjunction with each embodiment, in a process of implementing the present disclosure claimed to be protected, persons skilled in the art may understand and implement other variations of the disclosed embodiments by checking the accompanying drawings, the summary, and the appended claims. In the claims, 'comprising' may not exclude other components or steps, 'a' or 'one' may not exclude plurality. A single processor or other units may implement several functions listed in the claims. Different dependent claims record some measures, but it does not mean that these measures cannot be combined to generate a good effect.

Persons skilled in the art shall understand that the embodiments of the present disclosure may be provided as a method, an apparatus (device), or a computer program product. Thus, forms of complete hardware embodiments, complete software embodiments, or embodiments integrating software and hardware may be adopted in the present disclosure. Moreover, a form of the computer program product implemented on one or more computer available storage media (including, but not limited to, a disk memory, a CD-ROM, an optical memory and the like) containing computer available program codes may be adopted in the present disclosure. The computer programs are stored/distributed in an appropriate medium, the computer programs and other hardware are provided as or used as parts of the hardware, or other distribution forms may be adopted such as an Internet form or other wired or wireless telecommunication system forms.

The present disclosure is illustrated with reference to flowcharts and/or block diagrams of the method, the apparatus (device) and the computer program product according to the embodiments of the present disclosure. It shall be understood that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

Although the present disclosure is illustrated in conjunction with specific features and embodiments thereof, the present disclosure may be susceptible to various modifications and changes without departing from the spirit and scope of the present disclosure, obviously. Accordingly, the present description and accompanying drawings are merely exemplary illustrations to the present disclosure defined by the appended claims, and are regarded as any and all modifications, changes, combinations or equivalents within the covered scope of the present disclosure. Obviously, persons skilled in the art may make various modifications and transformations on the present disclosure without departing from the spirit and scope of the present disclosure. Thus, if these modifications and transformations of the present disclosure fall within the scope of the claims of the present disclosure and an equivalent technology thereof, the present disclosure is also intended to include these modifications and transformations.

What is claimed is:

1. A method, comprising:
   receiving a first fingerprint image;
   determining a number of target feature points of the first fingerprint image;
   acquiring a target adjustment parameter corresponding to the number of the target feature points according to a preset mapping relationship between the number of feature points and adjustment parameters;
   receiving a second fingerprint image according to the target adjustment parameter;
   matching the second fingerprint image with a preset fingerprint template; and
   unlocking a terminal when the second fingerprint image matches with the preset fingerprint template.

2. The method of claim 1, wherein determining the number of the target feature points of the first fingerprint image comprises:
   dividing the first fingerprint image into N independent regions, N being an integer greater than 1; and
   determining a number of feature points within a unit area according to a part of the N independent regions, and determining the number of the feature points within the unit area to be the number of the target feature points of the first fingerprint image.

3. The method of claim 1, wherein determining the number of the target feature points of the first fingerprint image comprises:
   extracting feature points of the first fingerprint image; and
   determining the number of the feature points of the first fingerprint image to be the number of the target feature points of the first fingerprint image.

4. The method of claim 1, wherein the method further comprises following act after the first fingerprint image is received and before the number of the target feature points of the first fingerprint image is determined:
   determining whether the first fingerprint image is a first image or a second image, and when the first fingerprint image is the first image or the second image, executing the process of determining the number of the target feature points of the first fingerprint image.

5. The method of claim 4, wherein determining whether the first fingerprint image is the first image or the second image comprises:
   extracting feature points within a partial region of the first fingerprint image; and
   determining whether the number of the feature points within the partial region is smaller than a preset threshold, and when the number of the feature points within the partial region is smaller than the preset threshold, determining that the first fingerprint image is the first image or the second image.

6. The method of claim 1, wherein determining the second fingerprint image according to the target adjustment parameter comprises:
   collecting a preset number of pixel points according to the target adjustment parameter, and receiving the second fingerprint image according to the preset number of pixel points.

7. A terminal comprising:
   a memory configured to store executable program codes; and
   a processor configured to invoke the executable program codes to perform: receiving a first fingerprint image;
   determining a number of target feature points of the first fingerprint image;
   acquiring a target adjustment parameter corresponding to the number of the target feature points according to a preset mapping relationship between the number of feature points and adjustment parameters;
   receiving a second fingerprint image according to the target adjustment parameter;

matching the second fingerprint image with a preset fingerprint template; and unlocking the terminal when the second fingerprint image matches with the preset fingerprint template.

8. The terminal of claim 7, wherein the processor is further configured to: divide the first fingerprint image into N independent regions, N being an integer greater than 1; and determine the number of feature points within a unit area according to a part of the N independent regions, and determining the number of the feature points within the unit area to be the number of the target feature points.

9. The terminal of claim 7, wherein the processor is further configured to:

extract feature points of the first fingerprint image; and determine the number of the feature points to be the number of the target feature points of the first fingerprint image.

10. The terminal of claim 7, wherein the processor is further configured to:

judge whether the first fingerprint image is a first image or a second image; and determine the number of the target feature points of the first fingerprint image when the first fingerprint image is the first image or the second image.

11. The terminal of claim 10, wherein the processor is further configured to:

extract feature points within a partial region of the first fingerprint image; and judge whether the number of the feature points within the partial region is smaller than a preset threshold, and determining that the first fingerprint image is the first image or the second image when the number of the feature points within the partial region is smaller than the preset threshold.

12. The terminal of claim 7, wherein the processor is further configured to:

collect a preset number of pixel points according to the target adjustment parameter, and receiving the second fingerprint image according to the preset number of pixel points.

13. A terminal comprising:

a memory configured to store executable program codes; and a processor configured to invoke the executable program codes to perform:

receiving a first fingerprint image;

determining whether the first fingerprint image matches a preset condition;

determining a number of target feature points of the first fingerprint image when the first fingerprint image matches the preset condition;

acquiring a target adjustment parameter corresponding to the number of the target feature points according to a preset mapping relationship between the number of feature points and adjustment parameters;

receiving a second fingerprint image according to the target adjustment parameter; and unlocking the terminal when the second fingerprint image matches a preset fingerprint template.

14. The terminal of claim 13, wherein the preset condition comprises that the number of feature points of the first fingerprint image is less than a preset threshold.

15. The terminal of claim 13, wherein the preset condition comprises that the number of feature points of a part of the first fingerprint image is less than a preset threshold.

16. The terminal of claim 13, wherein the preset condition comprises that the number of feature points of the first fingerprint image falls within a preset range.

17. The terminal of claim 13, wherein the processor is further configured to:

determine a collection region of a fingerprint identification sensor of the terminal;

determine n2 normal underlying data values by means of n2 normal sensing electrodes in the collection region, and determining n1 abnormal underlying data values by means of n1 abnormal sensing electrodes in the collection region, an sensing electrode array of the fingerprint identification sensor at least containing the n1 abnormal sensing electrodes and the n2 normal sensing electrodes, and the n1 and the n2 being positive integers;

determine n1 underlying repairable data values corresponding to the n1 abnormal sensing electrodes according to the n2 normal underlying data values determined by means of the n2 normal sensing electrodes of the fingerprint identification sensor; and generate the first fingerprint image according to the n2 normal underlying data values and the n1 underlying repairable data values.

18. The terminal of claim 17, wherein the processor is further configured to:

divide the collection region into a plurality of independent regions, each of the plurality of independent regions containing a plurality of the normal underlying data values determined by means of the normal sensing electrodes and at least one of the abnormal underlying data values determined by means of the abnormal sensing electrodes; and determine an average value of all the normal underlying data values in one of the plurality of the independent regions, and determining the average value to be the underlying repairable data value corresponding to the abnormal sensing electrodes in the one of the plurality of the independent regions.

19. The terminal of claim 13, wherein the processor is further configured to:

divide the first fingerprint image into N independent regions, N being an integer greater than 1; and determine the number of feature points within a unit area according to a part of the N independent regions, and determine the number of the feature points within the unit area to be the number of the target feature points.

20. The terminal of claim 13, wherein the processor is further configured to:

extract feature points of the first fingerprint image; and determine the number of the feature points to be the number of the target feature points of the first fingerprint image.

* * * * *